(12) United States Patent
Jin et al.

(10) Patent No.: US 9,104,006 B2
(45) Date of Patent: Aug. 11, 2015

(54) TERMINAL BOX FOR OPTICAL FIBER AND POWER LINE COMPOSITE CABLE

(71) Applicant: LS Cable & System Ltd., Anyang-si, Gyeonggi-do (KR)

(72) Inventors: Sung-Su Jin, Busan (KR); Jong-Seb Baeck, Daegu (KR); In-Ha Jung, Anyang-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 30 days.

(21) Appl. No.: 14/224,657

(22) Filed: Mar. 25, 2014

(65) Prior Publication Data
US 2015/0185430 A1    Jul. 2, 2015

(30) Foreign Application Priority Data
Dec. 30, 2013   (KR) .................. 10-2013-0167580

(51) Int. Cl.
*G02B 6/00*   (2006.01)
*G02B 6/44*   (2006.01)
*H02G 3/16*   (2006.01)

(52) U.S. Cl.
CPC ................ *G02B 6/4448* (2013.01); *H02G 3/16* (2013.01)

(58) Field of Classification Search
CPC .. G02B 6/4452; G02B 6/3897; G02B 6/4471; G02B 6/4453; G02B 6/4454; G02B 6/00
USPC .................................. 385/134, 135, 136, 137
See application file for complete search history.

(56) References Cited

U.S. PATENT DOCUMENTS

| | | | | |
|---|---|---|---|---|
| 7,546,018 B2* | 6/2009 | Hendrickson et al. | ......... | 385/135 |
| 2013/0343716 A1* | 12/2013 | Kwon et al. | .................. | 385/135 |

* cited by examiner

*Primary Examiner* — Jennifer Doan
(74) *Attorney, Agent, or Firm* — Sherr & Jiang, PLLC (57) ABSTRACT

Disclosed is a terminal box for an optical fiber and power line composite cable. The terminal box includes a housing, a cable lead-in part provided at a side of the housing, a first intermediate connector provided in the housing, a second intermediate connector provided in the housing. The first intermediate connector and the second intermediate connector are provided on a base of the housing to have different heights.

10 Claims, 9 Drawing Sheets

TERMINAL BOX FOR OPTICAL FIBER AND POWER LINE COMPOSITE CABLE

CROSS REFERENCE TO PRIOR APPLICATION

The present application claims priority under 35 U.S.C. §119 to Korean Patent Application No. 10-2013-0167580 (filed on Dec. 30, 2013), which is hereby incorporated by reference in its entirety.

BACKGROUND OF THE INVENTION

1. Field of the Invention

The present invention relates to a terminal box for an optical fiber and power line composite cable, and more particularly, to a terminal box to which an optical fiber and power line composite cable including both optical fiber units and power line units is connected, and which is capable of minimizing an interference between the optical fiber units and the power line units when the optical fiber units and the power line units branch off from the optical fiber and power line composite cable and are pulled out of the terminal box.

2. Background Art

In the case of conventional mobile communications, a communication signal is transmitted to a base station from a backbone station of a telecommunication company or the like, and a radio-frequency (RF) signal is transmitted from a base transceiver station (BTS) of the base station via an antenna of the base station. A radio signal transmitted from a user's mobile phone is transmitted to the antenna of the base station, amplified through a tower mounted amplifier (TMA), and then supplied to the BTS. In this case, the base station, the TMA, and the antenna are connected via a coaxial feeder.

However, the longer the length of a cable, the greater signal loss in the coaxial feeder. When the antenna is installed at a tower having a height of several tens of meters, signal loss occurs in the coaxial feeder that connects the antenna and the base station installed on the ground. Since the signal loss occurring in the coaxial feeder causes a signal supplied from the base station to have an intensity that is less than signal intensity required in the antenna, the supplied signal attenuates. Thus, the supplied signal needs to be amplified by the degree to which the signal attenuates in the coaxial feeder, thereby causing additional power consumption. Also, since the intensity of a signal transmitted from a mobile phone to the antenna of the base station is relatively low, it is very difficult to transmit the signal to the BTS via the coaxial feeder causing high signal loss. Accordingly, it is necessary to install a TMA at an input unit of the antenna to amplify the attenuating signal. However, since the TMA consumes a relative large amount of power to amplify the signal, high costs are incurred to perform maintenance and repair, thereby lowering system efficiency.

SUMMARY OF THE INVENTION

It is therefore an object of the present invention to provide a terminal box for an optical fiber and power line composite cable in which both optical fiber units configured to transmit and receive an optical signal and power line units configured to supply power are included to improve system efficiency.

It is another object of the present invention to provide a terminal box capable of minimizing a crosstalk between optical fiber units and power line units when a connection cable that is connected to a remote radio unit (RRU) is configured with the optical fiber units and the power line units branching off from an optical fiber and power line composite cable.

DETAILED DESCRIPTION OF THE EXEMPLARY EMBODIMENT

Hereinafter, exemplary embodiments of the present invention will be described in further detail with reference to the accompanying drawings. The present invention may, however, be embodied in many different forms and should not be construed as limited to the embodiments set forth herein. Rather, these embodiments are provided so that this disclosure will be thorough and complete, and fully convey the scope of the invention to those skilled in the art. Throughout the specification, the same reference numbers may be used to denote similar components in various embodiments.

Figure 1:
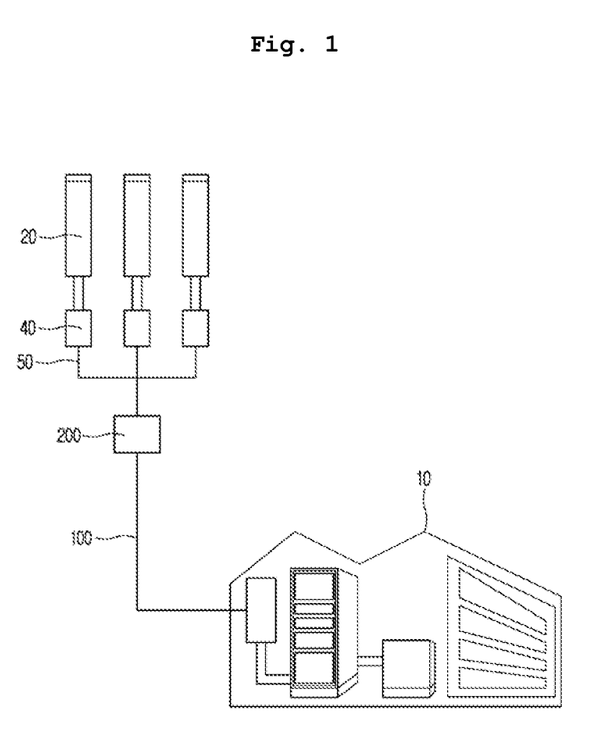
FIG. 1 is a diagram schematically illustrating the structure of a mobile telecommunication base station with an optical fiber and power line composite cable according to an embodiment of the present invention.

FIG. 1 is a diagram schematically illustrating the structure of a mobile telecommunication base station with an optical fiber and power line composite cable 100 according to an embodiment of the present invention.

A remote radio unit (RRU) has been introduced to compensate for high power consumption of and inefficient management and recovery performed by a conventional mobile telecommunication base station using a tower mounted amplifier (TMA). The RRU separates an RF unit (RU) from the existing base transceiver station (BTS), disposes the RU on a base station tower, and remotely controls the RU. Here, RRU equipment and the remaining BTS from which the RU is separated, i.e., a baseband unit (BBU), are connected via an optical cable in which signal attenuation hardly occurs, and a power supply cable is additionally used to supply power to the RRU. Also, since the RRU is installed on the base station tower together with the antenna of the base station, the length of a coaxial feeder that connects the antenna of the base station and the RU may be minimized and the TMA need not be installed. Thus, signal amplification need not be additionally performed for a signal that attenuates in the coaxial feeder, and the efficiency of maintenance and repair performed by the base station increases. A system including the RRU will be described with reference to the accompanying drawings below.

Referring to FIG. 1, the mobile telecommunication base station includes a base transceiver station (BTS) 10 configured to exchange a communication signal with a backbone station of a telecommunication company or a user's mobile phone, and to receive power from a power supply source, e.g., Korea Electric Power Corporation (KEPCO); the optical fiber and power line composite cable 100 configured to optically and electrically connect the BTS 10 and remote radio units (RRUs) 40; an outdoor terminal 200 for the optical fiber and power line composite cable 100 (hereinafter referred to as the 'terminal box 200'), through which optical fiber units and power line units are separated from the optical fiber and power line composite cable 100; the RRUs 40 configured to receive an optical signal and power from the optical fiber units and the power line units separated through the terminal box 200 or to transmit an optical signal to the optical fiber units; and antennae 20 via which a radio communication signal is received from or transmitted to the RRUs 40.

As well known, the degree of signal loss according to cable length is relatively very low in the optical fiber units each including an optical fiber, compared to a coaxial cable. Thus, when an optical signal is transmitted as close to an input unit of the antenna 20 as possible by using the optical fiber, attenuation of the optical signal may be minimized. The RRU 40 is installed adjacent to the input unit of the antenna 20 to transform the optical signal transmitted via the optical fiber into a radio-frequency (RF) signal to be radiated from the antenna 20. Thus, the degree of signal attenuation caused by loss of a signal to be supplied to the antenna 20 may be reduced to the minimum and thus the TMA that consumes a large amount of power may be omitted.

Consequently, the optical fiber and power line composite cable 100 according to the present embodiment is provided in the form of a hybrid type cable including both optical fiber units 130 (see FIG. 3) connected from the BTS 10 to the RRUs 40 and each including an optical fiber and optical power line units 110 (see FIG. 3) configured to transmit power to be supplied to the RRUs 40. When the optical fiber and power line composite cable 100 is used, the optical fiber and power line composite cable 100 is relatively easy to install at a tower with an antenna and the RRUs 40 are connected using the single terminal box 200, thereby relatively reducing installation costs, compared to a structure in which optical fiber units and power line units are separated.

The structure of the optical fiber and power line composite cable 100 will be described with reference to the accompanying drawings below.

Figure 2:
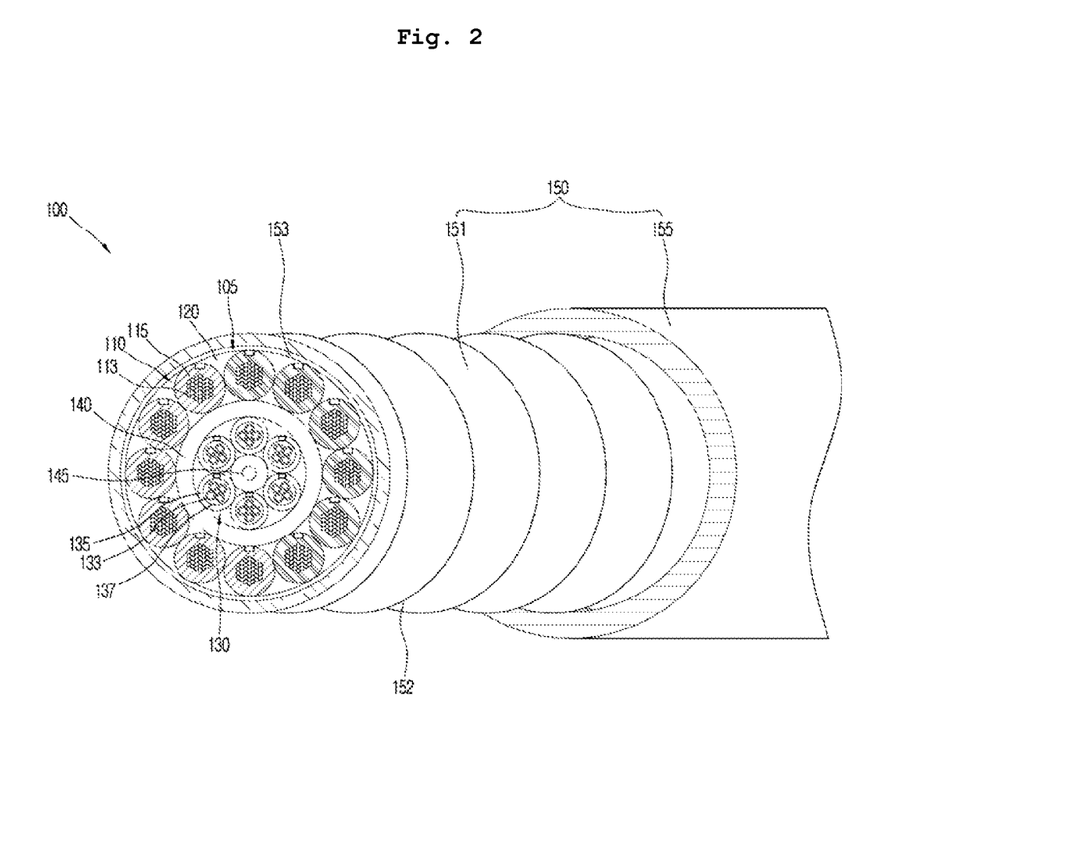
FIG. 2 illustrates the structure of an optical fiber and power line composite cable according to an embodiment of the present invention.

FIG. 2 is a perspective view illustrating the structure of an optical fiber and power line composite cable 100 according to an embodiment of the present invention.

Referring to FIG. 2, the optical fiber and power line composite cable 100 includes a cable core 105 and an outer layer 150 covering the cable core 105.

The cable core 105 may include a plurality of power line units 110 configured to supply power, and a plurality of optical fiber units 130 configured to transmit an optical signal. The cable core 105 may further include a filler 120 filled in gaps between the power line units 110 and the optical fiber units 130 and having a circular outer circumference. The outer layer 150 may include a protective metal layer 151 with wrinkles 152 including a plurality of wrinkle peaks 152A and a plurality of wrinkle valleys 152B that are alternately formed to cover the cable core 105. The cable core 105 may further include a non-woven fabric tape 153 for wrapping an outer circumference of the cable core 105.

Each of the power line units 110 includes a plurality of conductors 113 and an insulator 115 covering the conductor 113. The power line units 110 may have a form according to general power standards. The conductors 113 may be twisted together. The conductors 113 may be formed of a metal such as copper or aluminum. The insulator 115 may be formed of polymer resin such as polyethylene, polypropylene, or polyvinyl chloride.

The optical fiber units 130 may be manufactured in any form, provided that they include an optical fiber for transmitting an optical signal. For example, the optical fiber units 130 may each include an optical fiber 133 with at least one strand and a tube 135 that wraps the optical fiber 133. The tube 135 may be formed of, for example, polybutyleneterephtalate (PBT), polypropylene, polyethylene, polyvinyl chloride, etc. In addition, the inside of the tube 135 may be filled with filler. For example, the inside of the tube 135 may be filled with jelly or a tensile material 137 such as aramid yarn. The tensile material 137 has high tensile strength, is flexible, and thus enables a cable to be stably installed.

The outer layer 150 is formed on an outermost side of the optical fiber and power line composite cable 100 to form an outer shape of the optical fiber and power line composite cable 100, and protects the optical fiber units 130 and the power line units 110 included in the optical fiber and power line composite cable 100.

For example, the outer layer 150 may internally contact the cable core 105, and may include the protective metal layer 151 that wraps the outer circumference of the cable core 105 in a circular shape and protects the cable core 105 from external shocks, and an outer coating layer 155 wrapping the protective metal layer 151. The protective metal layer 151 has a corrugated form in which the wrinkle peaks 152A and the wrinkle valleys 152B are alternately formed, and may be configured as a metal tube formed of, for example, aluminum. In order to form the protective metal layer 151, a plate type metal material is prepared together with the cable core 105 including the optical fiber units 130 and the power line units 110, the plate type metal material is then rolled up to wrap an outer side of the cable core 105, and both ends of the metal material that contact each other are fused by welding or the like, thereby manufacturing a tube having a desired diameter. Then, the tube is pressed at predetermined intervals to be outwardly corrugated. In this case, the relationship between an internal diameter $D_i$ of the wrinkle valley 152B and an external diameter $D_c$ of the cable core 105 is important, as will be described in detail below.

The outer coating layer 155 may be formed of resin that is an eco-friendly material having flame-retardant properties. For example, the outer coating layer 155 may be formed of polyethylene, polypropylene, polyvinyl chlorine (PVC), or the like.

The cable core 105 may further include the non-woven fabric tape 153 covering the outer circumference of the cable core 105 and wrapping the power line units 110 and the optical fiber units 130 in a circular shape. The non-woven fabric tape 153 is a compressed non-woven fabric and is disposed to wrap the optical fiber units 130 and the power line units 110. The non-woven fabric tape 153 may be formed by cross-winding or vertically adding a tape type material.

In the optical fiber and power line composite cable 100, the gaps in the cable core 105 may be filled with the filler 120. That is, the power line units 110 each have a circular shape and thus gaps are present between adjacent power line units 110. In this case, the whole optical fiber and power line composite cable 100 cannot be maintained in a circular shape and is thus vulnerable to a bending force or shocks applied from the outside. Thus, when the gaps in the cable core 105 are filled with the filler 120 and an outer shape of the filler 120 is maintained in a circular shape, the whole optical fiber and power line composite cable 100 has a structure that can stand external shocks.

In the optical fiber and power line composite cable 100 of FIG. 2, the optical fiber units 130 are included in the cable core 105 and the power line units 110 are disposed along the outer circumferences of the optical fiber units 130. When the power line units 110 and the optical fiber units 130 are compared, since the optical fibers 133 included in the optical fiber units 130 are relatively more likely to be bent or broken, the optical fiber units 130 are protected by being included to be more adjacent to the center of the cable core 105 than the power unit lines 110. In this case, a protective layer 140 may be included between the power line units 110 and the optical fiber units 130 to wrap and protect the optical fiber units 130.

Also, a central pulling line 145 may be installed in a central region of the optical fiber and power line composite cable 100 to prevent the optical fiber and power line composite cable 100 from being bent more than necessary. The central pulling line 145 is located in the central region of the optical fiber and power line composite cable 100 to provide a repulsive force when a bending force is applied to the optical fiber and power line composite cable 100, thereby preventing the optical fiber and power line composite cable 100 from being bent more than necessary and supporting contraction of the tube 135 when a temperature changes. Accordingly, the optical fiber units 130 may be prevented from being damaged.

The power line units 110 and the optical fiber units 130 branch off from the optical fiber and power line composite cable 100 through the terminal box 200 as described above, and are connected to RRUs 40 (which will be described below) by forming a connection cable 50 (see FIG. 1) by combining an appropriate number of power line units 110 and an appropriate number of optical fiber units 130.

Thus, the optical fiber and power line composite cable 100 is inserted into the terminal box 200, and branches into the power line units 110 and the optical fiber unit 130 as individual units. Furthermore, in order to form the connection cable 50 to be connected to the RRUs 40, an appropriate number of power line units 110 and an appropriate number of optical fiber units 130 may be combined in the terminal box 200.

While in the terminal box 200, the power line units 110 and the optical fiber units 130 branch off from the optical fiber and power line composite cable 100 and are then combined to form the connection cable 50, an interference may occur between the power line units 110 and the optical fiber units 130. The interference lowers the work efficiency of an operator and acts as a main factor that increases a time and costs required to manufacture the terminal box 200. Thus, the terminal box 200 according to the present embodiment is configured to prevent a interference from occurring between the power line units 110 and the optical fiber units 130 when in the terminal box 200, the power line units 110 and the optical fiber units 130 branch off from the optical fiber and power line composite cable 100 and are combined to form the connection cable 50, as will be described in detail with reference to the accompanying drawings below.

Figure 3:
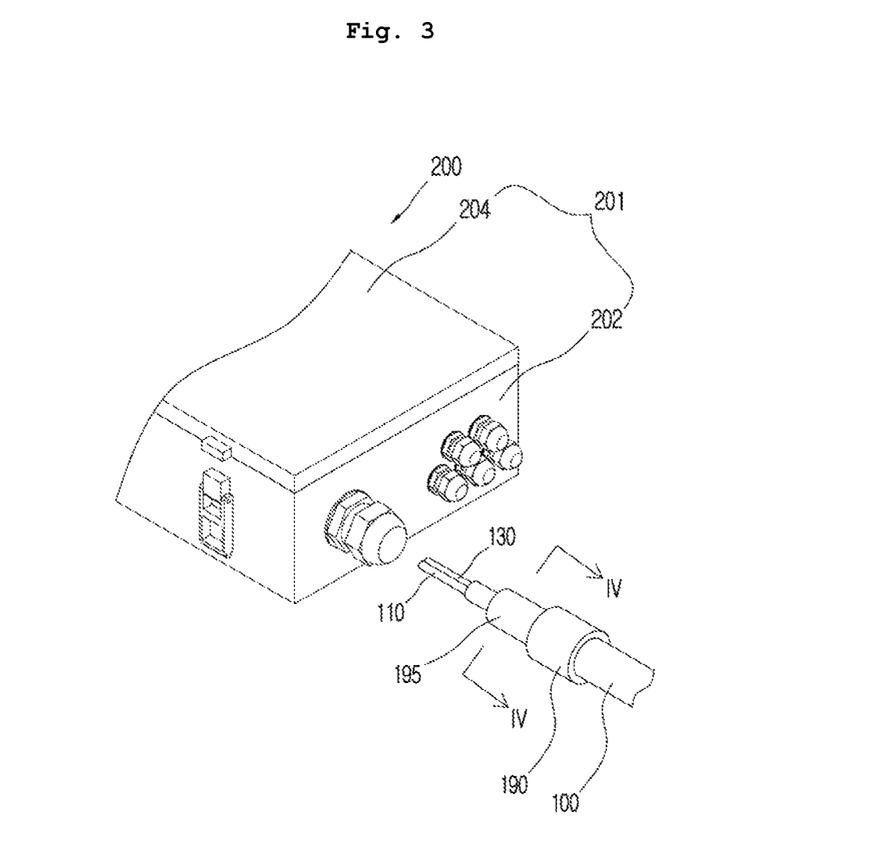
FIG. 3 is a perspective view of a terminal box to which an optical fiber and power line composite cable is connected according to an embodiment of the present invention.
Figure 4:
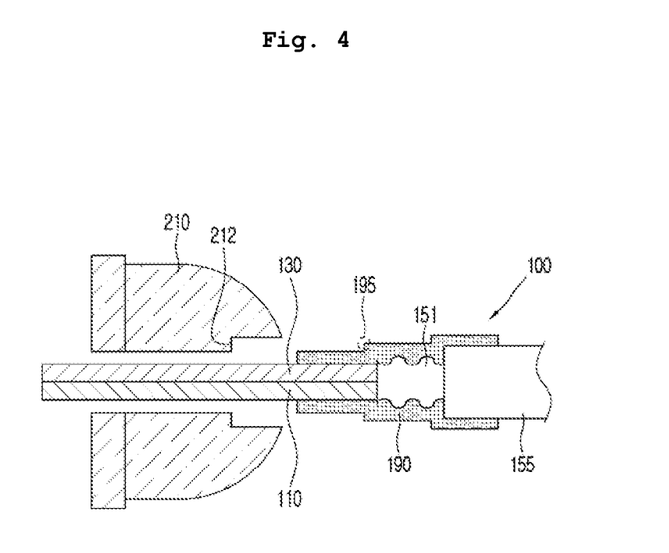
FIG. 4 is a cross-sectional view taken along line IV-IV of FIG. 3.

FIG. 3 is a perspective view of a terminal box 200 to which an optical fiber and power line composite cable 100 is connected according to an embodiment of the present invention. FIG. 4 is a cross-sectional view taken along line IV-IV of FIG. 3.

Referring to FIGS. 3 and 4, the terminal box 200 may include a housing 201 forming an outer shape of the terminal box 200, a cable lead-in part 210 installed at one side of the housing 201 and via which the optical fiber and power line composite cable 100 is inserted into and connected to the terminal box 200, and a plurality of cable lead-out parts 230 installed at one side of the housing 201 and via which the connection cable 50 that is a combination of an optical fiber unit 130 and a power line unit 110 is pulled out of the housing 201.

The outer coating layer 155, the protective metal layer 151, and the non-woven fabric tape 153 are sequentially removed from at least one end portion of the optical fiber and power line composite cable 100, and the optical fiber and power line composite cable 100 is connected to the terminal box 200. In this case, a predetermined length of the optical fiber and power line composite cable 100 is inserted and fixed into the terminal box 200. To this end, a connector 190 including at least one stepped portion 195 may be installed at one end portion of the optical fiber and power line composite cable 100 to be connected to the cable lead-in part 210 of the terminal box 200.

As illustrated in FIG. 4, in order to connect one end portion of the optical fiber and power line composite cable 100 to the cable lead-in part 210 of the terminal box 200, the outer coating layer 155, the protective metal layer 151, and the non-woven fabric tape 153 are sequentially removed from one end portion of the optical fiber and power line composite cable 100, and the power line units 100 and the optical fiber units 130 included in the optical fiber and power line composite cable 100 are connected inside the terminal box 200. In this case, the connector 190 is installed to not only protect the exposed end portion of the optical fiber and power line composite cable 100 but also fix the optical fiber and power line composite cable 100 not to be inserted into the terminal box 200 to a predetermined length or more.

The connector 190 may be embodied, for example, as a heat-shrinkable tube. If the connector 190 is installed at the end portion of the optical fiber and power line composite cable 100, the at least one stepped portion 195 is formed when the outer coating layer 155, the protective metal layer 151, and the non-woven fabric tape 153 are removed from the end portion of the optical fiber and power line composite cable 100. For example, when the outer coating layer 155 is removed, the at least one stepped portion 195 is formed on the connector 190 formed outside the protective metal layer 151. The thickness of the at least one stepped portion 195 on the protective metal layer 151 may be equal to or greater than the thickness of the outer coating layer 155. A cog portion 212 having a predetermined internal diameter may be formed in the cable lead-in part 210 of the terminal box 200. Here, the internal diameter of the cog portion 212 is determined to be less than the external diameter of the outer coating layer 155. Thus, when the end portion of the optical fiber and power line composite cable 100 is inserted into the cable lead-in part 210, the at least one stepped portion 195 of the connector 190 is engaged with the cog portion 212, thereby fixing the optical fiber and power line composite cable 100 not to be inserted into the terminal box 200 any further. An internal structure of the terminal box 200 will be described in detail below.

Figure 5:
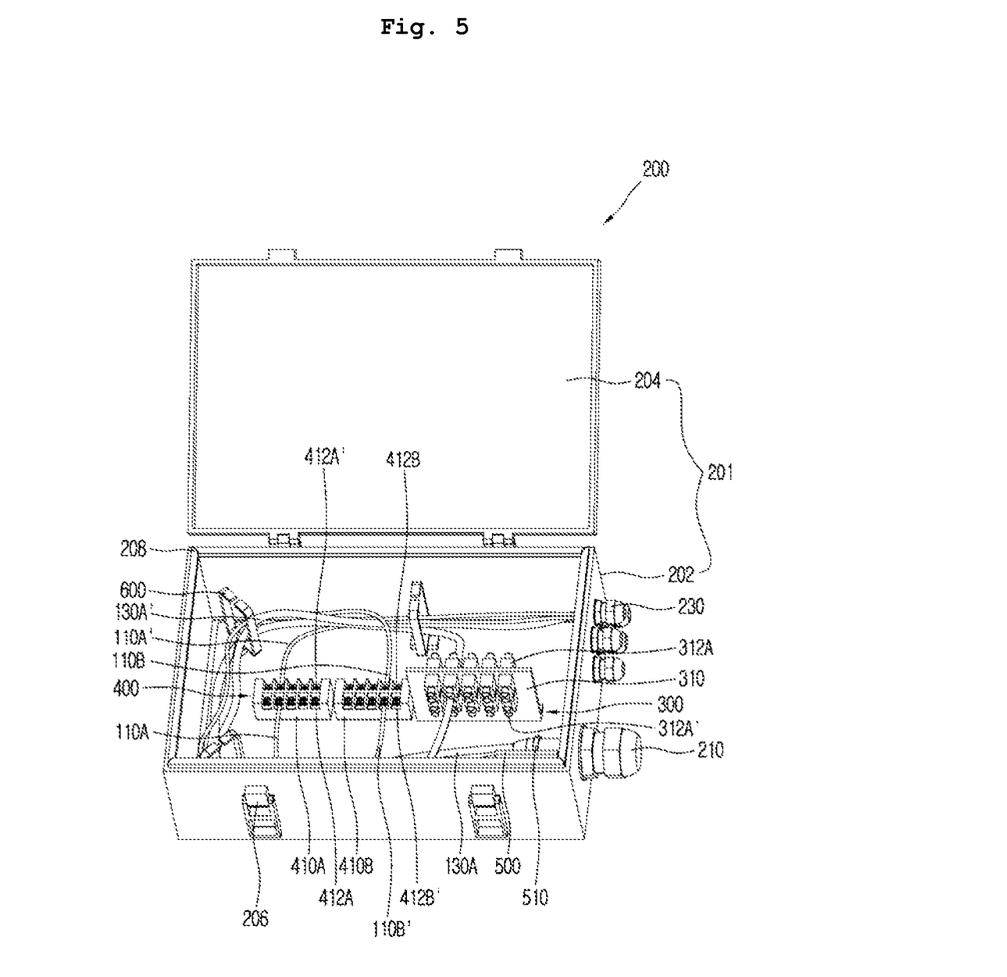
FIG. 5 is a perspective view illustrating an internal structure of the terminal box.
Figure 6:
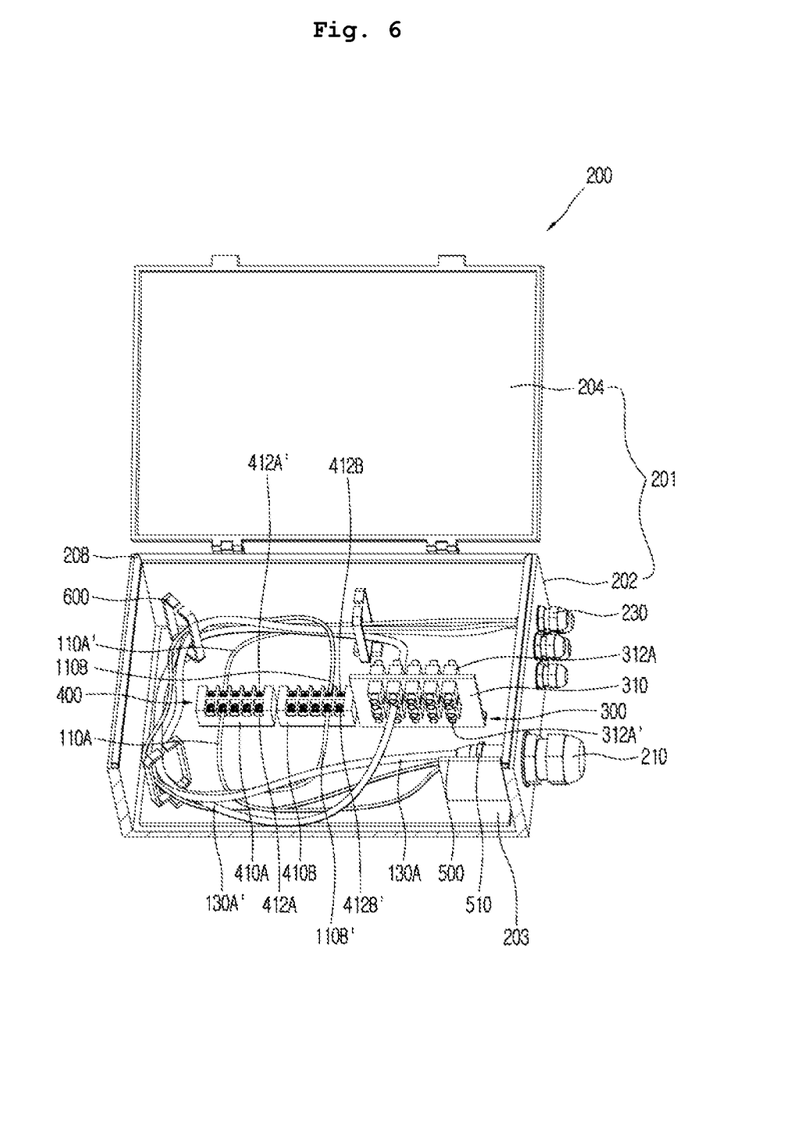
FIG. 6 is a perspective of the terminal box of FIG. 5 in which some sidewalls are cut.

FIG. 5 is a perspective view illustrating an internal structure of the terminal box 200. FIG. 6 is a perspective of the terminal box of FIG. 5 in which some sidewalls are cut to clarify the internal structure of the terminal box 200. Although for convenience of explanation, FIG. 5 illustrates that an optical fiber and power line composite cable 100 includes one optical fiber unit 130 and two power line units 110 (i.e., a pair of power line units 110), the total numbers of the optical fiber units 130 and the power line units 110 to be included in the optical fiber and power line composite cable 100 are not limited thereto. Also, although the connection cable 50 pulled out of the terminal box 200 is illustrated as including a combination of one optical fiber unit 130 and two power line units 110 (i.e., a pair of power line units 110), embodiments of the present invention are not limited thereto.

Referring to FIGS. 5 and 6, the terminal box 200 includes a housing 201 forming an outer shape; a cable lead-in part 210 that is installed on one side of the housing 201 and via which the optical fiber and power line composite cable 100 is inserted into and connected to the terminal box 200; a first intermediate connector 300 installed inside the housing 201, and configured to connect a lead-in optical fiber unit 130A, which branch off from the optical fiber and power line composite cable 100, inserted into the housing 201 and a lead-out optical fiber unit 130A' pulled out of the housing 201; a second intermediate connector 400 installed inside the housing 201, and configured to connect lead-in power line units 110A and 110B, which branch off from the optical fiber and power line composite cable 100, inserted into the housing 201 and lead-out power line units 110A' and 110B' pulled out of the housing 201; and a plurality of cable lead-out parts 230 installed on a side of the housing 201 and via which the connection cable 50 that is a combination of the lead-out optical fiber unit 130A' and the lead-out power line units 110A' and 110B' is pulled out of the housing 201. The first intermediate connector 300 and the second intermediate connector 400 are installed on a base 203 of the housing 201 to have different heights.

In the terminal box 200, the housing 201 forms an outer shape of the terminal box 200, has a roughly hexahedral shape, and includes a main body 202, the upper portion of which is open and a cover 204 configured to open/close an opening of the main body 202. The cover 204 may be installed on a side of the main body 202 to be rotatable through a hinge or the like. Thus, an operator may open or close the opening of the main body 202 by rotating the cover 204. A locking device 206 may be installed on a side of each of the cover 204 and the main body 202 to maintain a locked state of the cover 204. Furthermore, a sealing member 208 such as a gasket may be formed on at least one of the cover 204 and the main body 202 to protect the terminal box 200 against external substances, e.g., moisture, when the cover 204 is closed.

The housing 201 may be firmly constructed to be protected from a change in temperature and humidity, e.g., snow, rain, sunshine, etc. in consideration of an environment in which the terminal box 200 is installed, and manufactured using a material such as aluminum to prevent internal elements thereof from being damaged.

The optical fiber and power line composite cable 100 is inserted into the housing 201 via the cable lead-in part 210 of the housing 201, and members capable of supporting and fixing the optical fiber and power line composite cable 100 may be installed on an internal side of the cable lead-in part 210 of the housing 201. For example, as illustrated in FIGS. 5 and 6, a plate type supporter 500 configured to support the optical fiber and power line composite cable 100 and a fixing unit 510 connected to the supporter 500 to fix the optical fiber and power line composite cable 100. The supporter 500 may extend vertically upward from the base 203 of the housing 201. The fixing unit 510 may be embodied as, for example, a stainless steel band connected to the supporter 500 so as to fix the optical fiber and power line composite cable 100.

In this case, the power line units 110 and the optical fiber units 130 included in the optical fiber and power line composite cable 100 individually branch off from the optical fiber and power line composite cable 100 inside the housing 201.

The first intermediate connector 300 may be installed in the housing 201 to optically connect the lead-in optical fiber unit 130A, which branch off from the optical fiber and power line composite cable 100, inserted into the housing 201 and the optical fiber unit 130A' pulled out of the housing 201. Also, the second intermediate connector 400 may be installed in the housing 201 to electrically connect the lead-in power line units 110A and 110B, which branch off from the optical fiber and power line composite cable 100, inserted into the housing 201 and the lead-out power line units 110A' and 110B' pulled out of the housing 201.

The housing 200 that forms the outer shape of the terminal box 200 may be configured to be not only easily manufactured and assembled but also have an optimized volume to reduce an installation space. Thus, the internal volume of the housing 201 may be small. Consequently, an interference may occur between the optical fiber units 130 and the power line units 110 when both the first intermediate connector 300 and the second intermediate connector 400 are installed in the housing 201, the lead-in optical fiber unit 130A and the lead-out optical fiber unit 130A' are connected to the first intermediate connector 300, and the lead-in power line units 110A and 110B and the lead-out power line units 110A' and 110B' are connected to the second intermediate connector 400. The interference makes it difficult to arrange the optical fiber units 130 and the power line units 110, and increases a time and costs for constructing the internal structure of the terminal box 200.

Thus, when the terminal box 200 according to the present embodiment includes the first intermediate connector 300 and the second intermediate connector 400 in the housing 201, the first intermediate connector 300 and the second intermediate connector 400 are installed on the base 203 of the housing 201 to have different heights. Also, the first intermediate connector 300 and the second intermediate connector 400 may be considered as being disposed on different virtual planes in the housing 201 to prevent the interference from occurring between the optical fiber units 130 and the power line units 110.

Thus, the heights of (or distances between) the first intermediate connector 300 and the second intermediate connector 400 on the base 203 of the housing 201, and more particularly, the height of an input/output (I/O) socket 312 of the first intermediate connector 300 connected to the lead-in optical fiber unit 130A and the lead-out optical fiber unit 130A' and the height of an I/O terminal 412 of the second intermediate connector 400 connected to the lead-in power line units 110A and 110B and the lead-out power line units 110A' and 110B' may be set to be different to prevent the interference from occurring between the optical fiber units 130 connected to the first intermediate connector 300 and the power line units 110 connected to the second intermediate connector 400.

Figure 7:
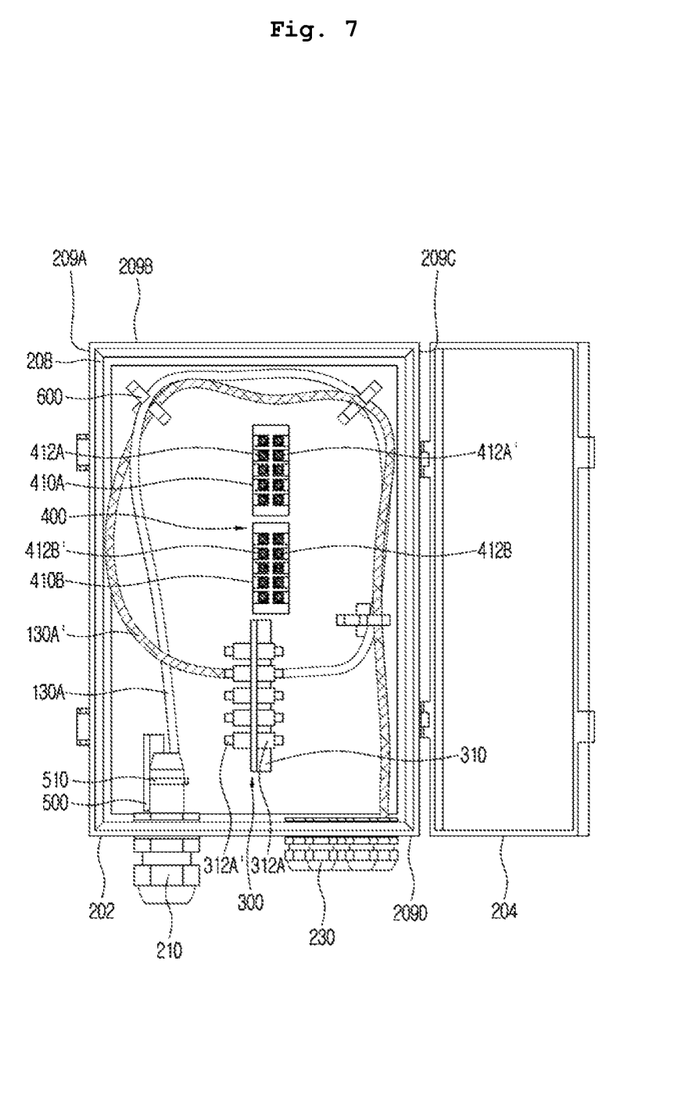
FIG. 7 is a plan view illustrating a connection between a lead-in optical fiber unit and a lead-out optical fiber unit in the terminal box of FIG. 5.
Figure 9:
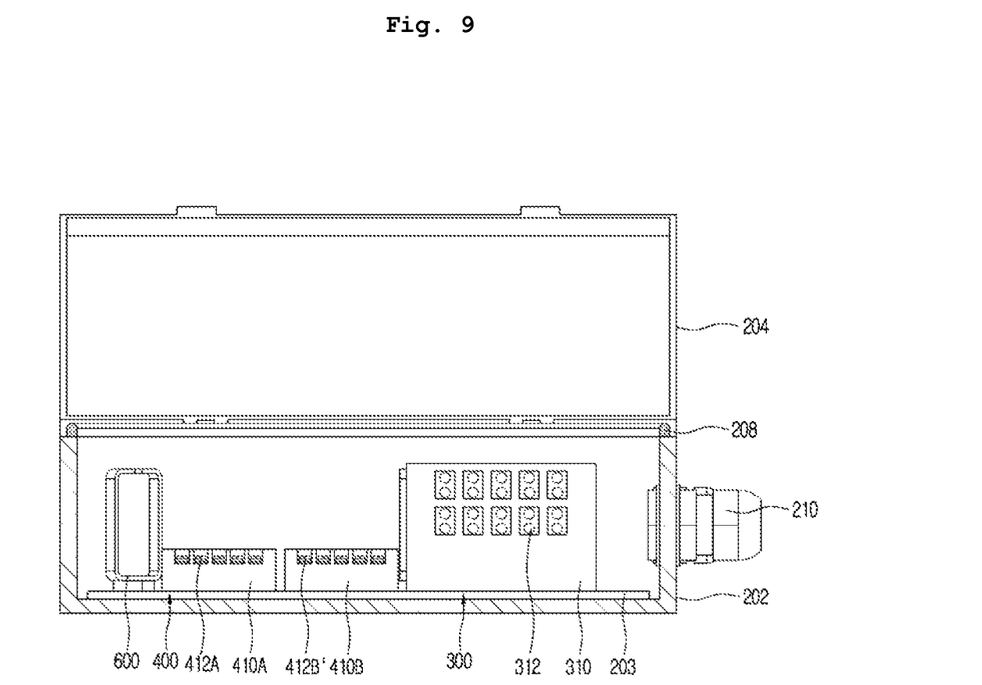
FIG. 9 is a side view of the terminal box of FIG. 5.

FIG. 7 is a plan view illustrating a connection between the lead-in optical fiber unit 130A and the lead-out optical fiber unit 130A' in the terminal box 200. FIG. 9 is a side view of the terminal box 200 of FIG. 7. In FIG. 7, the power line units 110 are not illustrated to clarify a connection between the optical fibers 130. In FIG. 9, both the power line units 110 and the optical fibers 130 are not illustrated. Furthermore, in FIG. 7, the lead-in optical fiber unit 130A and the lead-out optical fiber unit 130A' are illustrated to be differentiated from each other.

Referring to FIGS. 7 and 9, in the housing 201, the first intermediate connector 300 may be installed to optically connect the lead-in optical fiber unit 130A inserted into the housing 201 and the lead-out optical fiber unit 130A' pulled out of the housing 201.

The height between the first intermediate connector 300 and the base 203 of the housing 201, and more particularly, the height of the I/O socket 312 of the first intermediate connector 300 to which the lead-in optical fiber unit 130A and the lead-out optical fiber unit 130A' are connected may be set to be greater than the height of the second intermediate connector 400 to which the power line units 110 are connected. Also, the height between the first intermediate connector 300 and the base 203 of the housing 201 may be set to be greater than the heights of the cable lead-in part 210 and the cable lead-out part 230. Thus, in the terminal box 200 according to the present embodiment, the height of the first intermediate connector 300 is greatest from the base 203 of the housing 201 among the first intermediate connector 300, the second intermediate connector 400, the cable lead-in part 210, and the cable lead-out part 230. The cable lead-in part 210 and the cable lead-out part 230 may be located on the base 203 of the housing 201 at the substantially same height.

Thus, even if the first intermediate connector 300 and the second intermediate connector 400 are disposed to be adjacent to each other as shown in the plan view of FIG. 7, the first intermediate connector 300 and the second intermediate connector 400 are installed on the base 203 of the housing 201 to have different heights. Thus, the optical fiber units 130 and the power line units 110 may be easily installed to be connected to one another without causing an interference to occur therebetween.

In detail, the first intermediate connector 300 may include a mount 310 extending from the base 203 of the housing 201 to protrude by a predetermined length, and a plurality of I/O sockets 312 disposed on the mount 310. The mount 310 may be formed of aluminum to firmly support the first intermediate connector 300, similar to the housing 201.

A plurality of input sockets 312A to which a plurality of lead-in optical fiber units 130A are optically connected, and a plurality of output sockets 312A' corresponding to the input sockets 312A may be installed on the mount 310. A plurality of lead-out optical fiber units 130A' are optically connected to the output socket 312A'.

The optical fiber unit 130 includes a plurality of optical fibers 133 therein as described above. As described above, the optical fibers 133 are advantageous in that the degree of signal loss according to a cable length is relatively very low but is very vulnerable to mechanical forces applied from the outside, compared to the coaxial feeder. Thus, when the lead-in optical fiber unit 130A or the lead-out optical fiber unit 130A' is connected to the first intermediate connector 300, it is important to minimize a bending force to be applied to the lead-in optical fiber unit 130A or the lead-out optical fiber unit 130A'. To minimize the bending force, the lead-in optical fiber unit 130A should be bent to form a circular arc having a radius as long as possible when the lead-in optical fiber unit 130A is bent to be connected to the input socket 312A of the first intermediate connector 300.

For example, if the lead-in optical fiber unit 130A is connected to the input socket 312A of the first intermediate connector 300 right after passing through the cable lead-in part 210, a movement trajectory of the lead-in optical fiber unit 130A forms a circular arc having a relatively small radius. Thus, in this case, a relatively high bending force may be applied to the lead-in optical fiber unit 130A, thereby damaging the optical fibers 133 included in the lead-in optical fiber unit 130A.

Accordingly, in the present embodiment, when the lead-in optical fiber unit 130A passes through the cable lead-in part 210 and is then connected to the first intermediate connector 300, the lead-in optical fiber unit 130A is installed to pass by at least two sidewalls 209A and 209B among sidewalls of the main body 202 of the housing 201 and to be then connected to the first intermediate connector 300. Here, that the lead-in optical fiber unit 130A passes by the at least two sidewalls 209A and 209B may mean that the movement trajectory of the lead-in optical fiber unit 130A is formed in the main body 202 to be adjacent to the at least two sidewalls 209A and 209B.

As described above, when the lead-in optical fiber unit 130A is disposed to pass by the at least two sidewalls 209A and 209B of the main body 202, i.e., to be adjacent to the at least two sidewalls 209A and 209B, the movement trajectory of the lead-in optical fiber unit 130A forms a circular arc having a relatively large radius, thereby minimizing a bending force to be applied to the lead-in optical fiber unit 130A.

The lead-out optical fiber unit 130A', one end of which is connected to the output socket 312A' of the first intermediate connector 300 and another end of which is pulled to the outside via the cable lead-out part 230 may be disposed similar to the lead-in optical fiber unit 130A. That is, the lead-out optical fiber unit 130A' has one end connected to the output socket 312A' of the first intermediate connector 300, passes by at least two sidewalls 209B and 209C of the main body 202, and is then connected to the cable lead-out part 230 to be pulled to the outside. The lead-out optical fiber unit 130A' is similar to the lead-in optical fiber unit 130A described above and is not redundantly described here.

When the lead-in optical fiber unit 130A and the lead-out optical fiber unit 130A' are arranged as described above, a plurality of optical fiber units 130 may be included in the housing 201. Thus, after a plurality of lead-in optical fiber units 130A and a plurality of lead-out optical fiber units 130A' are arranged, the lead-in optical fiber units 130A and the lead-out optical fiber units 130A' are preferably maintained in a fixed state not to move. To this end, first guides 600 may be installed in the housing 201 to collect the lead-in optical fiber units 130A and the lead-out optical fiber units 130A'. The first guides 600 may be formed of, for example, synthetic resin, and collect the lead-in optical fiber units 130A and the lead-out optical fiber units 130A'. An appropriate number of the first guides 600 may be used. For example, the first guides 600 may be installed either on the sidewalls 209 by which the lead-in optical fiber units 130A and the lead-out optical fiber units 130A' pass or on the base 203.

The second intermediate connector 400 may include a plurality of input terminals 412A and 412B and a plurality of output terminals 412A' and 412B' disposed on the base 203 of the housing 201, as will be described in detail below.

As illustrated in FIG. 7, the cable lead-in part 210 and the cable lead-out part 230 may be formed on the same sidewall 209D of the main body 202. When the cable lead-in part 210 and the cable lead-out part 230 are formed on the same sidewall 209D of the main body 202 as described above, the cable lead-in part 210 and the cable lead-out part 230 may be arranged on opposite locations on the sidewall 209D of the main body 202. That is, when the sidewall 209D is divided into two regions with respect to a virtual central vertical line on the sidewall 209D, the cable lead-in part 210 and the cable lead-out part 230 may be disposed in the two regions, respectively.

In this case, the first intermediate connector 300 may be disposed more adjacent to the sidewall 209D on which the cable lead-in part 210 and the cable lead-out part 230 are disposed than the second intermediate connector 400, so that movement trajectories of the lead-in optical fiber units 130A and the lead-out optical fiber units 130A' may be formed along a circular arc having a sufficiently large radius when the lead-in optical fiber units 130A and the lead-out optical fiber units 130A' are connected to the first intermediate connector 300.

Also, the first intermediate connector 300 may be disposed between the cable lead-in part 210 and the cable lead-out part 230 in the main body 202 of the housing 201. When the first intermediate connector 300 is disposed adjacent to the cable lead-in part 210 or the cable lead-out part 230, an interference may occur between one of the lead-in optical fiber unit 130A inserted into the terminal box 200 via the cable lead-in part 210 and the lead-out optical fiber unit 130A' pulled out of the terminal box 200 via the cable lead-out part 230, and the first intermediate connector 300.

The arrangement of the power line units 110 in the housing 201 will now be described.

Figure 8:
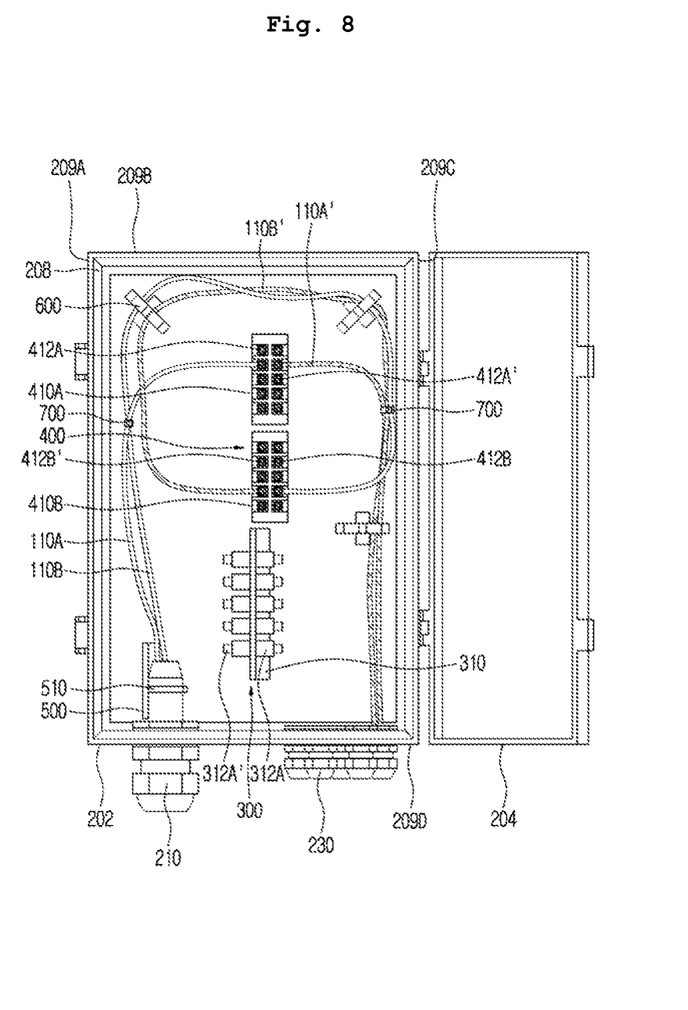
FIG. 8 is a plan view illustrating a connection between lead-in power line units and lead-out power line units in the terminal box of FIG. 5.

FIG. 8 is a plan view illustrating a connection between the lead-in power line units 110A and 110B and the lead-out power line units 110A' and 110B' in the terminal box 200. FIG. 9 is a side view of the terminal box 200 of FIG. 8. In FIG. 8, the optical fiber units 130 are not illustrated to clarify a connection between the power line units 110. In FIG. 9, both the power line units 110 and the optical fibers 130 are not illustrated. Furthermore, in FIG. 8, the lead-in power line units 110A and 110B and the lead-out power line units 110A' and 110B' are illustrated to be differentiated from each other.

Referring to FIGS. 8 and 9, the lead-in power line units 110A and 110B branching off from the optical fiber and power line composite cable 100 pass through the cable lead-in part 210, are inserted into the housing 201, and are electrically connected to the second intermediate connector 400. In this case, the second intermediate connector 400 includes a plurality of input terminals 412A and 412B and a plurality of output terminals 412A' and 412B' installed directly on the base 203 of the housing 201, so that the height of the second intermediate connector 400 and the height of the first intermediate connector 300 may be different from each other. FIG. 8 illustrates that a pair of lead-in power line units 110A and 110B are installed and the second intermediate connector 400 includes a pair of second sub intermediate connectors 410A and 410B (OK?) corresponding to the pair of lead-in power line units 110A and 110B. The second sub intermediate connector 410A includes the input terminal 412A and the output terminal 412A, and the second sub intermediate connector 410B includes the input terminal 412B and the output terminal 412B'. Thus, the pair of lead-in power line units 110A and 110B are connected to the input terminals 412A and 412B. The lead-out power line unit 110A' having one end connected to the output terminal 412A' and the lead-out power line unit 110B' having one end connected to the output terminal 412B' are pulled to the outside via the cable lead-out part 230.

The power line units 110 have improved mechanical characteristics and thus need not be arranged to adjust a movement trajectory thereof, compared to the optical fiber units 130. However, as illustrated in FIG. 8, the lead-in power line units 110A and 110B and the lead-out power line units 110A' and 110B' may be also arranged to pass by at least one sidewall 209 of the main body 202.

Furthermore, when the lead-in power line units 110A and 110B and the lead-out power line units 110A' and 110B' are arranged, a plurality of the power line units 110 may be disposed in the housing 201. Thus, after the lead-in power line units 110A and 110B and the lead-out power line units 110A' and 110B' are arranged, the lead-in power line units 110A and 110B and the lead-out power line units 110A' and 110B' are preferably maintained in a fixed state not to move. To this end, a second guide 700 may be installed in the housing 201 to collect the lead-in power line units 110A and 110B and the lead-out power line units 110A' and 110B'. The second guide 700 may be embodied as a tie formed of, for example, synthetic resin. The second guide 700 may collect the lead-in power line units 110A and 110B and the lead-out power line units 110A' and 110B'. An appropriate number of the second guides 700 may be used. For example, the second guides 700 may be installed along sidewalls 209 through which the lead-in power line units 110A and 110B and the lead-out power line units 110A' and 110B' pass.

According to the one or more of the above embodiments of the present invention, a terminal box for an optical fiber and power line composite cable including both optical fiber units configured to transmit and receive an optical signal and power line units configured to supply power so as to improve system efficiency is used to remarkably reduce power consumption and costs and a time required to perform maintenance and repair when a fiber-to-the-antenna (FTTA) system is established.

Also, according to the embodiments of the present invention, when the optical fiber units and the power line units branch off from an optical fiber and power line composite cable and form a connection cable together to be connected to an RRU or the like, a terminal box may be configured to minimize an interference occurring between the optical fiber units and the power line units, thereby remarkably reducing a time needed to establish the FTTA system using the terminal box.

Although the present invention has been described with reference to the exemplary embodiments thereof, it would be understood by those skilled in the art that various changes and modifications may be made without departing from the technical conception and essential features of the present invention. Thus, it is clear that all modifications are included in the technical scope of the present invention as long as they include the components as claimed in the claims of the present invention.

What is claimed is:

1. A terminal box for an optical fiber and power line composite cable including optical fiber units and power line units, the terminal box comprising:
   a housing;
   a cable lead-in part provided at a side of the housing and via which the optical fiber and power line composite cable is inserted into and connected to the terminal box;
   a first intermediate connector provided in the housing, and configured to connect a lead-in optical fiber unit inserted into the housing and a lead-out optical fiber unit pulled out of the housing, the lead-in optical fiber unit branching off from the optical fiber and power line composite cable;
   a second intermediate connector provided in the housing, and configured to connect a lead-in power line unit inserted into the housing and a lead-out power line unit pulled out of the housing, the lead-in power line unit branching off from the optical fiber and power line composite cable; and
   a plurality of cable lead-out parts provided at a side of the housing, and via which a connection cable that is a combination of the lead-out optical fiber unit and the lead-out power line unit is pulled to the outside,
   wherein the first intermediate connector and the second intermediate connector are provided on a base of the housing to have different heights.

2. The terminal box as claimed in claim 1, wherein height between the first intermediate connector and the base of the housing is greater than heights of the second intermediate connector, the cable lead-in part, and the cable lead-out part.

3. The terminal box as claimed in claim 2, wherein the cable lead-in part and the cable lead-out part are provided on the base of the housing at a substantially same height.

4. The terminal box as claimed in claim 2, wherein the first intermediate connector comprises a mount extending from the base of the housing by a predetermined length and a plurality of input sockets and a plurality of output sockets provided on the mount, and the second intermediate connector comprises a plurality of input terminals and a plurality of output terminals provided on the base of the housing.

5. The terminal box as claimed in claim 1, wherein the housing comprises a main body having a hexahedral shape and an upper portion of which is open and a cover configured to open or close an opening of the main body,     the lead-in optical fiber unit is inserted into the housing, passes by at least two sidewalls of the main body, and is then connected to the first intermediate connector, and     the lead-out optical fiber unit passes by at least two sidewalls of the main body from the first intermediate connector, and is then connected to the cable lead-out part.

6. The terminal box as claimed in claim 5, wherein the cable lead-in part and the cable lead-out part are provided on a same sidewall of the main body.

7. The terminal box as claimed in claim 6, wherein the cable lead-in part and the cable lead-out part are provided on opposite locations on the same sidewall of the main body.

8. The terminal box as claimed in claim 6, wherein the first intermediate connector is provided more adjacent to the sidewall on which the cable lead-in part and the cable lead-out part are provided than the second intermediate connector.

9. The terminal box as claimed in claim 6, wherein the first intermediate connector is provided between the cable lead-in part and the cable lead-out part in the main body of the housing.

10. The terminal box as claimed in claim 1, further comprising:

a first guide provided in the housing to collect the lead-in optical fiber unit and the lead-out optical fiber unit; and     a second guide provided in the housing to collect the lead-in power line unit and the lead-out power line unit.

\* \* \* \* \*